United States Patent [19]
Prelec et al.

[11] Patent Number: 5,793,185
[45] Date of Patent: Aug. 11, 1998

[54] JUMP STARTER

[75] Inventors: Michael L. Prelec, Deland; Lawrence W. Gordon, Deltona, both of Fla.

[73] Assignee: Deltona Transformer Corporation, Deltona, Fla.

[21] Appl. No.: 872,623

[22] Filed: Jun. 10, 1997

[51] Int. Cl.$^6$ ............................................. H01M 10/46
[52] U.S. Cl. ................................... 320/104; 320/105
[58] Field of Search ................................. 320/103, 104, 320/105, 111, 112, 114, 115, DIG. 34, 101, 106

[56] References Cited

U.S. PATENT DOCUMENTS

| | | | |
|---|---|---|---|
| 3,118,101 | 1/1964 | Arber | 320/105 |
| 4,161,682 | 7/1979 | Corvette | 320/2 |
| 4,215,306 | 7/1980 | Mace | 320/2 |
| 4,902,955 | 2/1990 | Manis et al. | 320/2 |
| 5,075,614 | 12/1991 | Whiting | 320/105 |
| 5,077,513 | 12/1991 | Dea et al. | 320/2 |
| 5,083,076 | 1/1992 | Scott | 320/2 |
| 5,297,977 | 3/1994 | Lamper | 439/504 |

FOREIGN PATENT DOCUMENTS

| | | |
|---|---|---|
| 5328620 | 12/1993 | Japan . |
| 2028022 | 2/1990 | United Kingdom . |
| 9428609 | 12/1994 | WIPO . |

*Primary Examiner*—Edward Tso
*Attorney, Agent, or Firm*—Edward M. Livingston, Esq.

[57] ABSTRACT

A jump starter has a hand-held charger case (1) that contains an internal battery (8), a battery charger (7), connections and controls that provide a needed variety of foolproof and convenient care of external batteries (9) such as vehicle batteries. Control components and circuits are provided to prevent overcharging and incorrect connection to batteries and to allow an external battery to be charged directly by the charger or by the internal battery. Cables, connections and controls allow the charger to accept AC electricity through an AC input cord (3) or DC electricity through a DC input cord (4) and respective converters (5, 6). Jump-start cables (27, 28, 29) with clamp connections (30) are positioned on opposite sides (34, 37) of the charger case and supportable by covered nonconductive cleat-support members (30, 31) to prevent contact with each other or with other objects when not in use. The AC input cords and DC input cords are positioned on opposite sides of the case for additional safety.

9 Claims, 4 Drawing Sheets

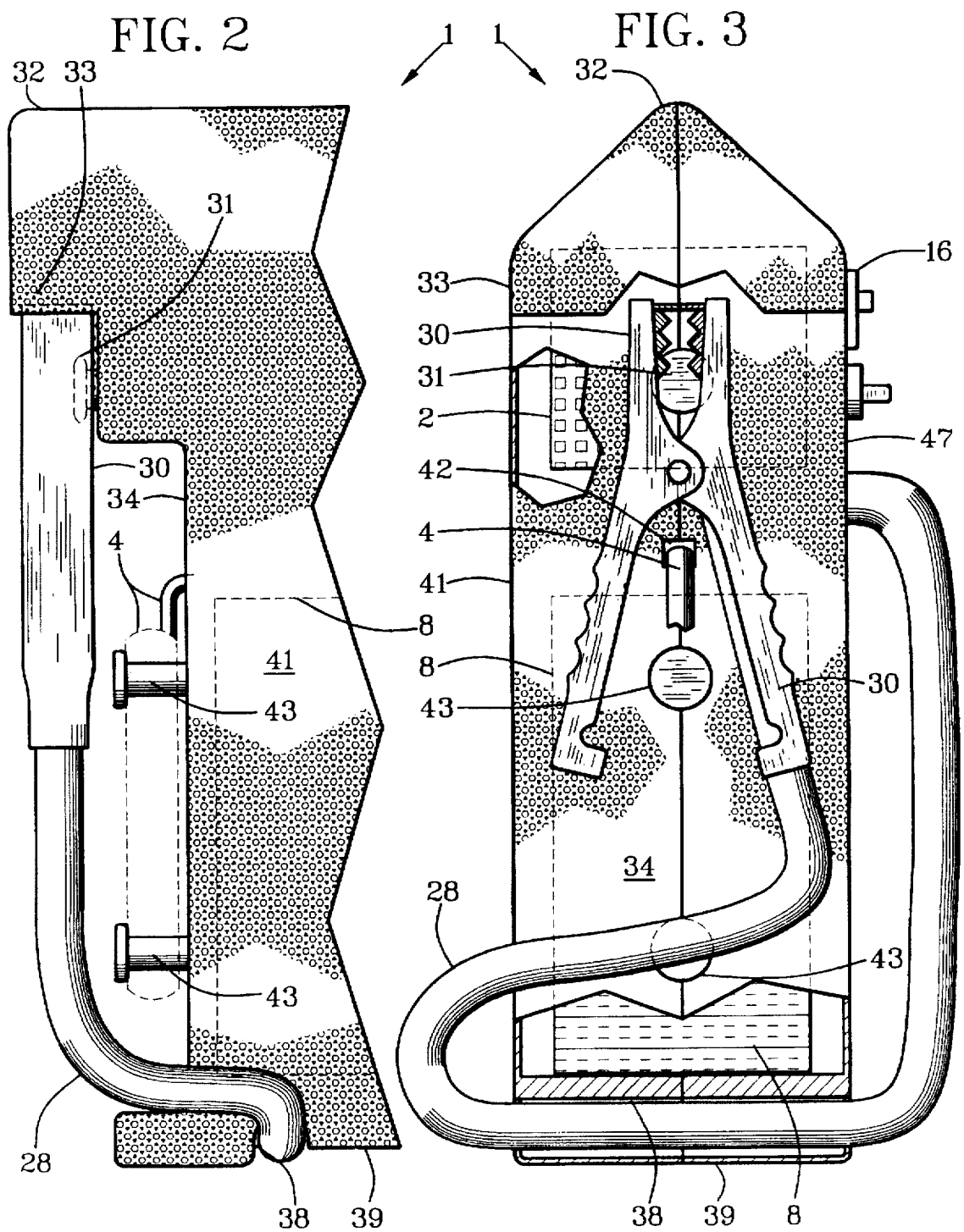

JUMP STARTER

BACKGROUND OF THE INVENTION

This invention relates to electrical jump starters for engines with dead batteries and to engine-battery chargers.

A wide variety of jump starters and battery chargers have been devised for starting cars that have dead batteries and for charging batteries. None, however, have been as convenient, foolproof, small and inexpensive for jump starting and charging batteries of motorcycles and cars as made possible by this invention.

Different but related jump starters and battery chargers are described in the following patent documents. U.S. Pat. No. 5,297,977, issued to Lamper, taught a battery-cable box. International Publication Number WO 94/28609, issued to Wells, et al., taught a battery having a battery-cable container. Japanese Patent Application Number 4-127575, issued to Fujiwara, described a casing for a battery charger having two internal batteries. U.K. Patent Application Number 2,028,022, issued to Meisner, described a battery charger in a container with a handle and an inlet with an inverter for recharging a battery in the battery charger with alternating current. U.S. Pat. No. 5,083,076, issued to Scott, described a cart-mounted battery charger having display lamps to indicate whether polarity hookup of jumper cables was correct. U.S. Pat. No. 5,077,513, issued to Dea, et al., taught a wheeled cart containing a source battery and a battery charger with special protection for the battery. U.S. Pat. No. 4,902,955, issued to Manis, et al., taught a wheeled jump starter with special provisions for preventing entanglement of jumper cables and having an air compressor for pressurizing car wheels. U.S. Pat. No. 4,215,306, issued to Mace, taught a mobile jump-starter having an electrical test probe system for detecting electrical shorts in vehicles. U.S. Pat. No. 4,161,682, issued to Corvette, taught an L-shaped frame on wheels for carrying a battery charger that included a tilt alarm to prevent spillage of battery-fluid electrolyte.

SUMMARY OF THE INVENTION

In light of need for improvement of jump starters and battery chargers, objects of this invention are to provide a jump starter which:

Prevents overcharging of either recipient batteries or a battery in the charger;

Stores cable on the charger without entanglement or damage;

Informs users of pertinent electrical factors related to vehicle-electrical systems;

Can be charged with AC electricity from a standard wall plug; or optionally,

Can be recharged with DC electricity from a wide variety of sources, including electrical systems of vehicles it starts; and Is light, inexpensive and long-lasting.

This invention accomplishes these and other objectives with a jump starter having a hand-held case that contains a source battery, a charger, connections and controls that provide a needed variety of foolproof and convenient care of vehicle batteries. Control circuits are provided to prevent overcharging and to allow an outside battery to be charged directly by the charger or by the source battery. Cables, connections and controls allow the charger to accept AC electricity through a rectifier and voltage converter to utilize current from standard electrical plugs. Alternatively, DC electricity can be provided from a DC source, including such DC sources as a cigarette lighter of a vehicle that may have been started or had its battery charged by the jump starter. Jump-start lines with clamp connections are positioned on opposite sides of the case and hung onto or variously stored in covered nonconductive storage-attachment bases to prevent contact with each other or with other objects when not in use. AC source lines and DC source lines are positioned on opposite sides of the case for additional safety.

The above and other objects, features and advantages of the present invention should become even more readily apparent to those skilled in the art upon a reading of the following detailed description in conjunction with the drawings wherein there is shown and described illustrative embodiments of the invention.

BRIEF DESCRIPTION OF DRAWINGS

This invention is described by appended claims in relation to description of a preferred embodiment with reference to the following drawings which are described briefly as follows:

FIG. 2 is a sectional side rear view;

FIG. 3 is a partial cutaway side elevation view;

DESCRIPTION OF PREFERRED EMBODIMENT

Figure 1:
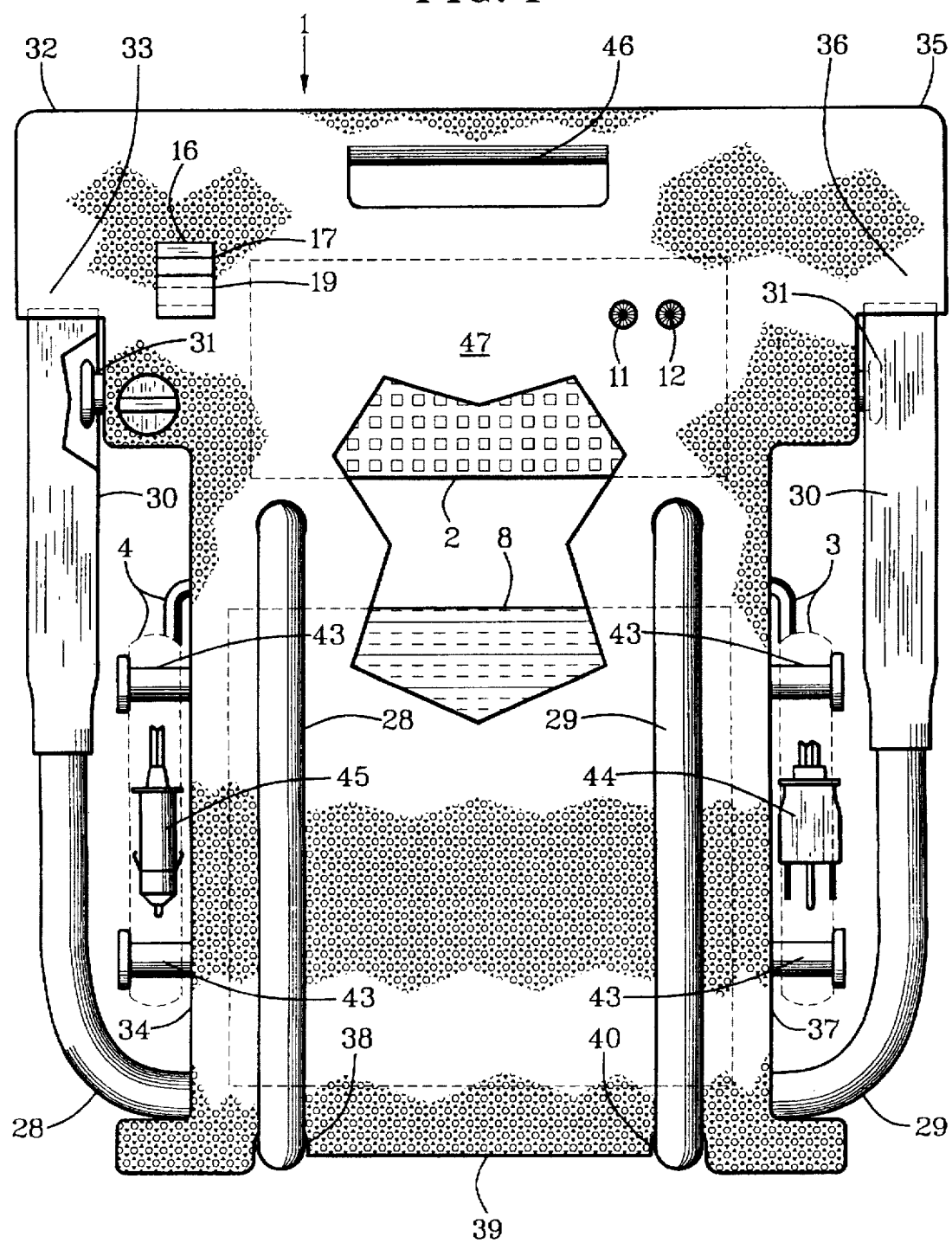
FIG. 1 is a partially cutaway front elevation view of the jump starter.

Features related to description of a preferred embodiment of this invention are shown in the drawings and listed numerically in order of their introduction as follows:

| | |
|---|---|
| 1. charger case | 26. jumper cables |
| 2. control container | 27. first jumper cable |
| 3. AC input cord | 28. second jumper cable |
| 4. DC input cord | 29. clamp connector |
| 5. AC - DC converter | 30. nonconductive clamp-connector cleat |
| 6. DC - DC converter | |
| 7. battery charger | 31. nonconductive clamp support |
| 8. internal battery | 32. first-side roof holster |
| 9. external battery | 33. first-side walls |
| 10. indicator lights | 34. first side of charger case |
| 11. charging-indicator LED | 35. second-side roof holster |
| 12. charged-indicator LED | 36. second-side walls |
| 13. charging-indicator circuitry | 37. second side of charger case |
| 14. charged-indicator circuitry | 38. first-cable channel |
| 15. function conveyance | 39. bottom wall of case |
| 16. function-selector switch | 40. second-cable channel |
| 17. external-battery position | 41. rear side |
| 18. internal-battery line | 42. power-input-line orifices |
| 19. internal-battery position | 43. wind-up spools or brackets |
| 20. DC output socket | 44. standard wall plug |
| 21. DC socket line | 45. standard DC plug |
| 22. socket battery connector | 46. top handle |
| 23. DC accessories | 47. front of case |
| 24. socket accessory connector | |
| 25. battery-output line | |

Figure 4:
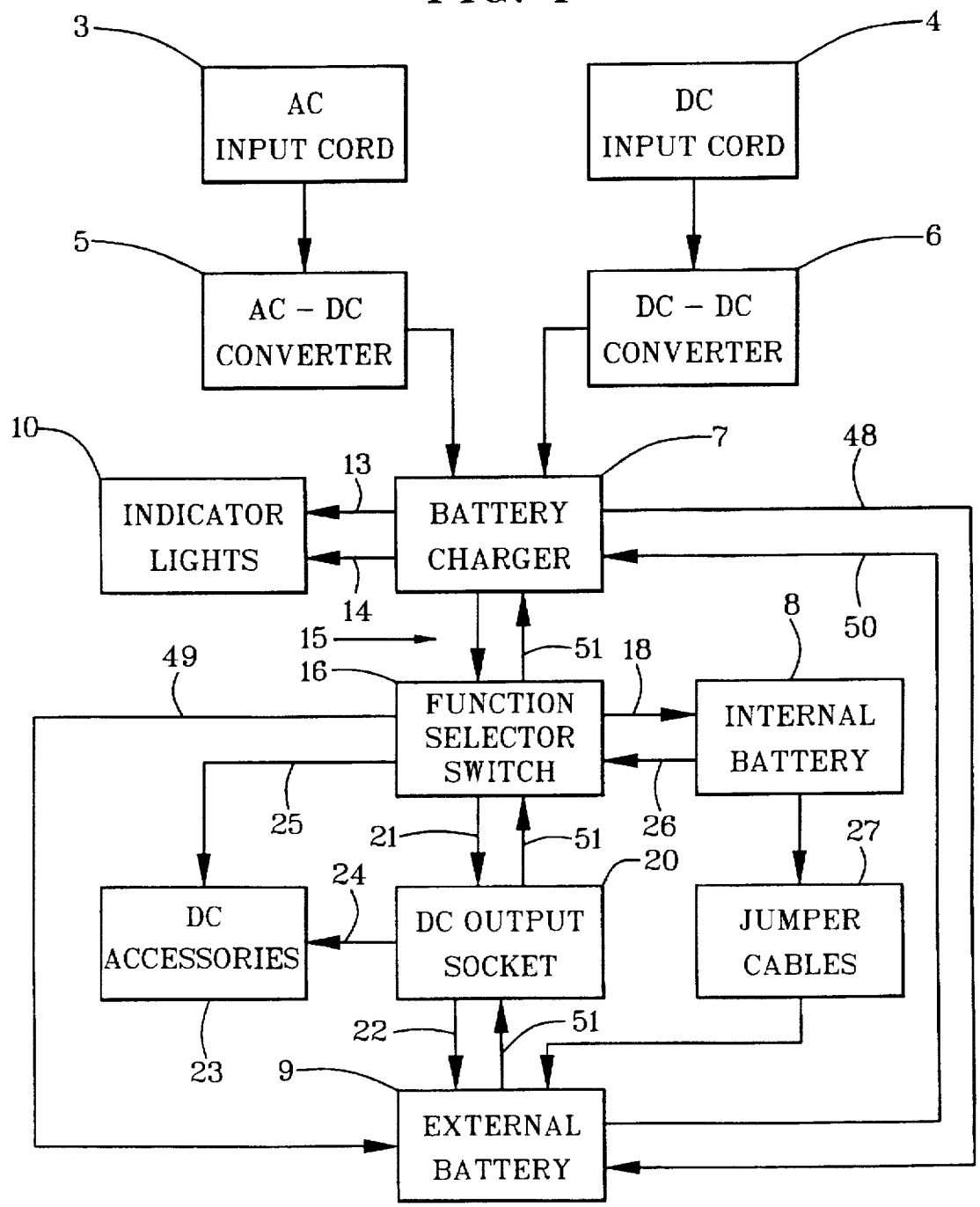
FIG. 4 is a diagram of a basic jump starter.

Reference is made first to FIGS. 1 and 4. A charger case 1 is sized, shaped and structured to contain components to provide a design selection of desired care of vehicle batteries. System-control components are contained by a control container 2 that can include circuitry such as printed circuit and electrical and/or electronic control components on a circuit board and/or in a circuit box. Electrical current to operate a charging circuit is provided through either an AC input cord 3 or optionally, a DC input cord 4. Current from the AC input cord 3 is routed through an AC-DC converter 5 that is an electrical transformer, rectifier and filter that is structured to convert AC line voltage to DC voltage that is required to operate a select battery-charger circuit that is contained by the charger case 1. Current from the DC cord 4 is routed through a DC-DC converter 6 that is an electrical booster to convert DC input voltage to DC voltage that is required to operate the select battery-charger circuit. DC Voltage required to operate the select battery-charger circuit is directed to a battery charger 7 that is a regulator of charge voltage and current required to charge and then to maintain charge of optionally an internal battery 8 or an external battery 9.

Indicator lights 10 are positioned externally on the charger case 1 to indicate whether a battery is being charged or has been charged and is being provided with a charge-maintenance current. The indicator lights 10 comprise charging-indicator LED 11 and a charged-indicator LED 12. The charging-indicator LED 11 has charging-indicator circuitry 13 in electrical communication with the battery charger 7 to cause the charging-indicator LED 11 to indicate that a normal charge is being supplied to an internal battery 8 or to an external battery 9. The charged-indicator LED 12 has charged-indicator circuitry 14 in electrical communication with the battery charger 7 to cause the charged-indicator LED 12 to indicate that a charged battery has been charged and that as-needed charging current is maintaining charge of the charged battery. The charging-indicator circuitry 13 and the charged-indicator circuitry 14 can include a design selection of electronic control components and circuitry.

Function conveyance 15 is in electrical communication between the battery charger 7 and a function-selector switch 16 with which functions of DC output are selected. The function-selector switch 16 has an external-battery position 17 that connects the battery charger 7 to an internal battery 8 through an internal-battery line 18. An internal-battery position 19 of the function-selector switch 16 connects the battery charger 7 to a DC output socket 20 through a DC socket line 21. The DC output socket 20 can be connected to an external battery 9 through a socket battery connector 22 and/or connected DC accessories 23 through a socket accessory connector 24. The internal battery 8 can be connected to the DC output socket 20 through a battery-input line 25 and the DC socket line 21 with the function-selector switch 16.

Reference is made now to FIGS. 1–4. Jumper cables 26 comprising a first jumper cable 27, which is electrically positive, and a second jumper cable 28, which is electrically negative, are connectable to an external battery 9 with clamp connectors 29. In a non-use mode, a clamp connector 29 of a first jumper cable 27 is hung onto, stored on or variously attached to a nonconductive clamp-connector cleat 30 and/or a nonconductive clamp support 31, either of which are shielded by a first-side roof holster 32 and first-side walls 33 of a first side 34 of the charger case 1. Likewise on the opposite side, a clamp connector 29 of a second jumper cable 28 is hung onto, stored on or variously attached to a nonconductive clamp-connector cleat 30 and/or a nonconductive clamp support 31, either of which are shielded by a second-side roof holster 35 and second-side walls 36 of a second side 37 of the charger case 1. The charger case 1 has a first-cable channel 38 in a bottom wall 39 of the first side 34 and a second-cable channel 40 in the bottom wall 39 of the second side 37. The first jumper cable 27 is in electrical communication from a first electrical pole of the internal battery 8 and extended outwardly from the charger case 1 at a relatively high portion of a front of the first side 34 and routed through the first-cable channel 38 to a rear side 41 of the charger case 1. There it is then routed to a connector-support member such as nonconductive clamp-connector cleat 30 and/or a nonconductive clamp support 31 on the first side 34 of the charger case 1. The second jumper cable 28 is in electrical communication from a second electrical pole of the internal battery 9 and extended outwardly from the charger case 1 at a relatively high portion of a front of the second side 37 and routed through the second-cable channel 40 to a rear side 41 of the charger case 1. There it is then routed to a nonconductive clamp-connector cleat 30 and/or a nonconductive clamp support 31 on the second side 37 of the charger case 1. The first jumper cable 27 is a positive-pole jumper cable that is attachable to a positive pole of the external battery 9 and the second jumper cable 28 is a negative-pole jumper cable that is attachable to a negative pole of the external battery 9.

The AC input cord 3 and the DC input cord 4 are extended through power-input-line orifices 42 in respectively opposite sides of the charger case 1 and are wound onto win-up spools 43 and-or brackets on the respectively opposite sides of the charger case 1 in non-use mode. The AC input cord 3 can have a standard wall plug 44 and the DC input cord 4 can have a standard DC plug 45.

Referring further to FIGS. 1–2, the charger case 1 can be waterproof and have a top handle 46 in a gable-like top portion intermediate the first-side roof holster 32 and the second-side roof holster 35.

The first jumper cable 27 and the second jumper cable 28 have lengths that provide designedly tight connection between positions of extension from a front 47 of the charger case 1 and the nonconductive clamp-connector cleat 30 to which the clamp connectors 29 are attachable in non-use mode.

Referring further to FIG. 4, the battery charger 7 can be in electrical communication with the external battery 9 through the function-selector switch 16, DC output socket 20 and socket battery connector 22. An external battery 9, such as a battery of a vehicle that may have been started by the internal battery 8 can be used to recharge the internal battery 8 with generated current through a DC input cord 4.

Figure 5:
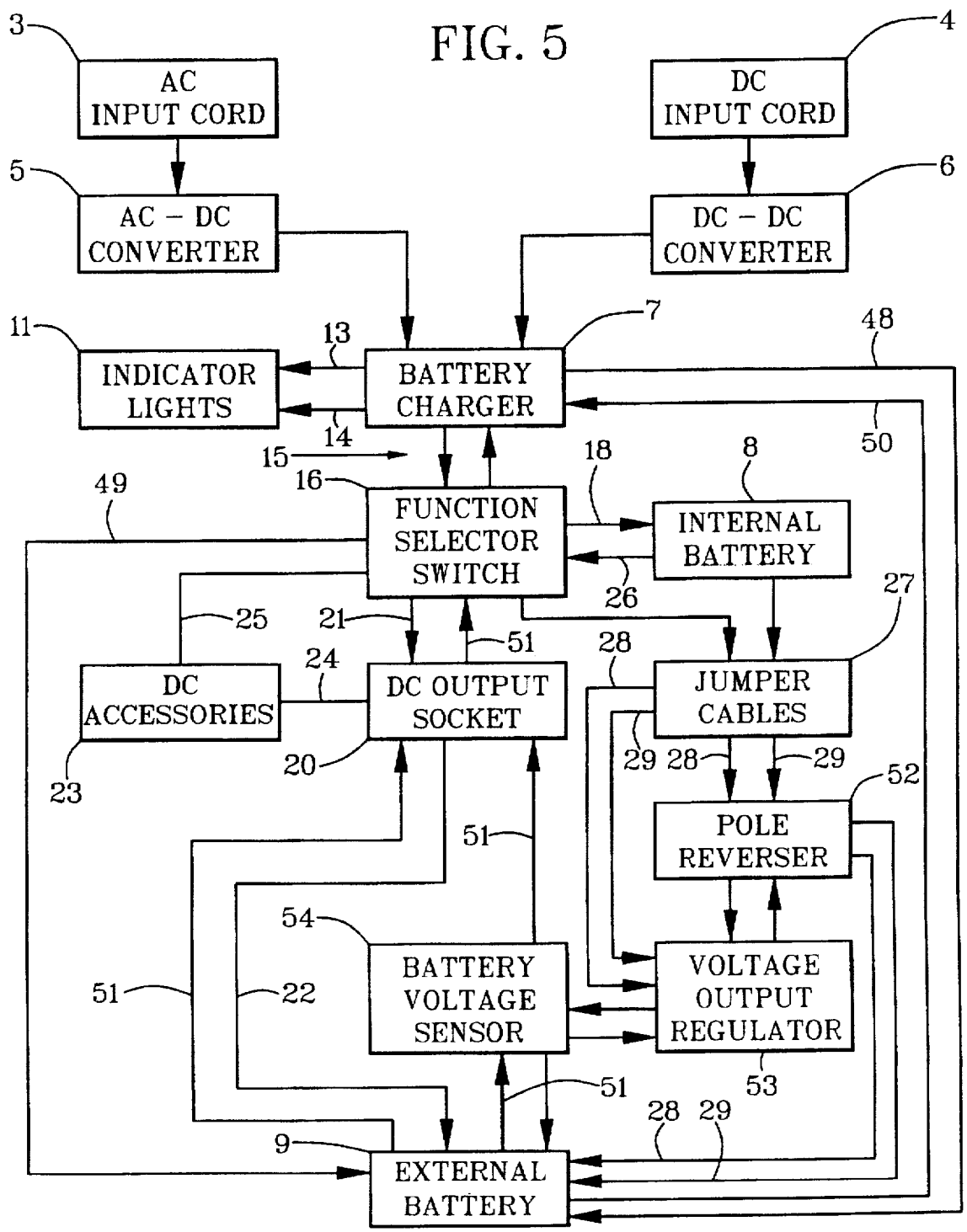
FIG. 5 is a diagram of a jump starter having a closable circuit to DC accessories.

Referring to FIG. 5, the jumper cables 26 comprising a first jumper cable 27 and a second jumper cable 28 can be in electrical communication from poles of the internal battery 8 to poles of an external battery 9.

A new and useful jump starter having been described, all such foreseeable modifications, adaptations, substitutions of equivalents, mathematical possibilities of combinations of parts, pluralities of parts, applications and forms thereof as described by the following claims and not precluded by prior art are included in this invention.

We claim:

1. A jump starter comprising:
 a charger case that is sized, shaped and structured to be hand-held and to contain components designedly to provide a design selection of desired care of vehicle batteries;
 an AC input cord having electrical conveyance from an AC source to an AC-DC converter that is contained by the charger case;
 the AC-DC converter being an electrical transformer, rectifier and filter that is structured to convert AC line voltage to DC voltage required to operate a select battery-charger circuit that is contained by the charger case;
 an AC charger line in electrical communication from the AC-DC converter to a battery charger that is contained by the charger case;

a DC input cord having electrical conveyance from a DC source to a DC-DC converter that is contained by the charger case;

the DC-DC converter being a boost converter that is structured to convert DC input voltage to DC voltage required to operate a select battery-charger circuit;

a DC charger line in electrical communication from the DC-DC converter to the battery charger;

the battery charger being a regulator of charge voltage and current required to charge and then to maintain charge of a battery;

a charging-indicator LED positioned externally on the charger case and having charging-indicator circuitry in electrical communication with the battery charger to cause the charging-indicator LED to indicate that a charge circuit is supplying normal charge to a battery;

a charged-indicator LED positioned externally on the charger case and having charged-indicator circuitry in electrical communication with the battery charger to cause the charged-indicator LED to indicate that a charged battery is charged and that a charging circuit is maintaining charge of the charged battery;

function conveyance in electrical communication between the battery charger and a function-selector switch with which functions of DC output are selected;

the function-selector switch having a first position that connects an output socket directly to an internal battery;

an internal-battery line in electrical communication from the function-selector switch to the internal battery;

the function-selector switch having a second position that connects the battery charger directly to a DC output socket;

the DC output socket being connectable to DC accessories or, optionally, the DC output socket being connectable to an external battery to charge the external battery directly;

jumper cables that are in electrical communication from poles of the internal battery to poles of an external battery; and an output line in electrical communication from the internal battery to the function-selector switch for electrical output to the DC output socket.

2. A jump starter as described in claim 1 wherein:

the charging-indicator LED is red and the charged-indicator LED is green.

3. A jump starter as described in claim 1 wherein:

the internal battery has a design voltage in relationship to external batteries to be jump-start charged.

4. A jump starter as described in claim 1 wherein:

voltage of the internal battery is as high as the highest voltage of external batteries to be provided with electrical input from the jump starter.

5. A jump starter as described in claim 1 wherein:

the charger case has a first-cable channel in a bottom wall of a first side and a second-cable channel in a bottom wall of a second side of the charger case;

a first jumper cable in electrical communication from a first electrical pole is extended outwardly from the charger case at a relatively high portion of a front first side of the charger case;

a second jumper cable in electrical communication from a second electrical pole is extended outwardly from the charger case at a high portion of a front second side of the charger case;

in a non-use mode of the jump starter, the first jumper cable is routed first through the first-cable channel to a rear side and then routed to a relatively high portion of a first side of the charger case where a clamp connector positioned on a distal end of the first jumper cable is supportable by a nonconductive that is shielded by a first-side roof holster and first-side walls to deter contact by opposite clamp connectors and by extraneous objects; and also in a non-use mode of the jump starter, the second jumper cable is routed first through the second-cable channel to a rear side and then routed to a relatively high portion of a second side of the charger case where a clamp connector positioned on a distal end of the second jumper cable is supportable by a nonconductive support member that is shielded by a second-side roof holster and second-side walls to deter contact by opposite clamp connectors and by extraneous objects.

6. A jump starter as described in claim 5 wherein:

the first jumper cable and the second jumper cable have lengths that provide designedly tight connection between positions of extension from a front of the charger case and nonconductive support members on which clamp connectors on distal ends of the first jumper cable and the second jumper cable respectively are stored in non-use mode of the jump starter.

7. A jump starter as described in claim 1 wherein:

the AC input cord and the DC input cord are extended through line orifices in respectively opposite sides of the charger case; and the AC input cord and the DC input cord are wound onto cord wind-up spools on the respectively opposite sides of the charger case in non-use mode of the jump starter.

8. A jump starter as described in claim 1 wherein:

the charger case is waterproof and has a top handle.

9. A jump starter comprising:

a charger case that is sized, shaped and structured to be hand-held and to contain components designedly to provide a design selection of desired care of vehicle batteries;

an AC input cord having electrical conveyance from an AC source to an AC-DC converter that is contained by the charger case;

the AC-DC converter being an electrical transformer, rectifier and filter that is structured to convert AC line voltage to DC voltage required to operate a select battery-charger circuit that is contained by the charger case;

an AC charger line in electrical communication from the AC-DC converter to a battery charger that is contained by the charger case;

a DC input cord having electrical conveyance from a DC source to a DC-DC converter that is contained by the charger case;

the DC-DC converter being a boost converter that is structured to convert DC input voltage to DC voltage required to operate a select battery-charger circuit;

a DC charger line in electrical communication from the DC-DC converter to the battery charger;

the battery charger being a regulator of charge voltage and current required to charge and then to maintain charge of a battery;

a charging-indicator LED positioned externally on the charger case and having charging-indicator circuitry in electrical communication with the battery charger to cause the charging-indicator LED to indicate that a charge circuit is supplying normal charge to a battery;

a charged-indicator LED positioned externally on the charger case and having uncharged-indicator control circuitry in electrical communication with the battery charger to cause the charged-indicator LED to indicate that a charged battery is charged and that a charging circuit is maintaining charge of the charged battery;

function conveyance in electrical communication between the battery charger and a function-selector switch with which functions of DC output are selected;

the function-selector switch having a first position that connects an output socket directly to an internal battery;

an internal-battery line in electrical communication from the function-selector switch to the internal battery;

the function-selector switch having a second position that connects the battery charger directly to a DC output socket;

the DC output socket being connectable to DC accessories or, optionally, the DC output socket being connectable to an external battery to charge the external battery directly;

jumper cables that are in electrical communication from poles of the internal battery to poles of an external battery;

an output line in electrical communication from the internal battery to the function-selector switch for electrical output to the DC output socket;

the charging-indicator LED being red and the charged-indicator LED being green;

an external-battery line in electrical communication from the function-selector switch to the external battery;

the jumper cables being connectable from poles of the internal battery to poles of an external battery;

voltage of the internal battery is as high as the highest voltage of external batteries to be provided with electrical input from the jump starter;

the charger case has a first-cable channel in a bottom wall of a first side and a second-cable channel in a bottom wall of a second side of the charger case;

a first jumper cable in electrical communication from a first electrical pole is extended outwardly from the charger case at a relatively high portion of a front first side of the charger case;

a second jumper cable in electrical communication from a second electrical pole is extended outwardly from the charger case at a high portion of a front second side of the charger case;

in a non-use mode of the jump starter, the first jumper cable is routed first through the first-cable channel to a rear side and then routed to a relatively high portion of a first side of the charger case where a clamp connector positioned on a distal end of the first jumper cable is supportable by a nonconductive cleat-support member that is shielded by a first-side roof holster and first-side walls to deter contact by opposite clamp connectors and by extraneous objects;

also in a non-use mode of the jump starter, the second jumper cable is routed first through the second-cable channel to a rear side and then routed to a relatively high portion of a second side of the charger case where a clamp connector positioned on a distal end of the second jumper cable is supportable by a nonconductive cleat-support member that is shielded by a second-side roof holster and second-side walls to deter contact by opposite clamp connectors and by extraneous objects;

the first jumper cable and the second jumper cable have lengths that provide designedly tight connection between positions of extension from a front of the charger case and nonconductive cleat-support members to which clamp connectors on distal ends of the first jumper cable and the second jumper cable respectively are connected in non-use mode of the jump starter;

the AC input cord and the DC input cord are extended through line orifices in respectively opposite sides of the charger case;

the AC input cord and the DC input cord are wound onto wind-up spools on the respectively opposite sides of the charger case in non-use mode of the jump starter; and the charger case is waterproof and has a top handle.

* * * * *